United States Patent
Pandey et al.

(10) Patent No.: US 12,160,465 B2
(45) Date of Patent: **\*Dec. 3, 2024**

(54) CAPACITY-AWARE LAYER-4 LOAD BALANCER

(71) Applicant: VMware LLC, Palo Alto, CA (US)

(72) Inventors: Sachin Pandey, Prayagraj (IN); Rohan Gandhi, Pune (IN); Sreeram Iyer, Bangalore (IN); Santosh Pallagatti Kotrabasappa, Bangalore (IN); Sairam Veeraswamy, Coimbatore (IN)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,304

(22) Filed: Jul. 28, 2023

(65) Prior Publication Data

US 2023/0403319 A1 Dec. 14, 2023

Related U.S. Application Data

(63) Continuation of application No. 17/746,830, filed on May 17, 2022, now Pat. No. 11,757,983.

(51) Int. Cl.
*H04L 67/1008* (2022.01)
*H04L 67/101* (2022.01)

(52) U.S. Cl.
CPC ........ *H04L 67/1008* (2013.01); *H04L 67/101* (2013.01)

(58) Field of Classification Search
CPC .... H04L 67/1008; H04L 67/101; H04L 67/01
See application file for complete search history.

(56) References Cited

U.S. PATENT DOCUMENTS

| | | | |
|---|---|---|---|
| 10,432,711 B1* | 10/2019 | Greenwood | H04L 67/01 |
| 11,757,983 B1 | 9/2023 | Pandey et al. | |
| 2017/0272343 A1* | 9/2017 | Giles | H04L 43/0888 |
| 2019/0149482 A1* | 5/2019 | Kumar | H04L 67/1023 |
| | | | 709/226 |
| 2022/0155968 A1* | 5/2022 | Shveidel | G06F 3/0653 |
| 2022/0188172 A1* | 6/2022 | Gupta | G06F 9/5044 |

\* cited by examiner

*Primary Examiner* — Johnny B Aguiar
(74) *Attorney, Agent, or Firm* — Quarles & Brady LLP

(57) ABSTRACT

Some embodiments provide a method of implementing capacity-aware load balancing across a set of data compute nodes (DCNs) by reducing latency for the set of DCNs. From the set of DCNs, the method identifies (1) a first subset of DCNs including DCNs that have a latency that is higher than an average latency computed for the set of DCNs and (2) a second subset of DCNs including DCNs that have a latency that is lower than the average latency computed for the set of DCNs. For each DCN in the first subset of DCNs, the method assigns to the DCN a weight value that corresponds to a target latency computed for the set of DCNs. Based on the assigned weight values for the first subset of DCNs, the method computes an excess weight value to be redistributed across the second subset of DCNs. The method redistributes the computed excess weight value across the second subset of DCNs.

18 Claims, 8 Drawing Sheets

| Symbol | Description |
|---|---|
| W | Weight and latency map for all DIPs. |
| L | Observed response latency for all DIPs. |
| m | Mean latency. |
| $w_{o,d}$ | Old weight for d-th DIP. |
| $w_{rd}$ | Weight to be redistributed. Initialized to 0. |
| $w_{n,d}$ (output) | New weight for the d-th DIP. |

605

Input: $W, L$ m = getMeanLatency($L$)
$D_h$ = getDipsWithHighLatency($L$, m)

for $d \in D_h$ do $w_{n,d} = W_{m,d}$ // set weight as per the map $w_{rd}\mathrel{+}= w_{m,d} - w_{n,d}$ end // Redistribution weight t=0
for $d \notin D_h$ do $t = 1/\,_{m-l_d}$ end for $d \notin D_h$ do $w_{n,d} = w_{o,d} + 1/_{m-l_d} \cdot t$ // proportional to inverse of latency difference end

CAPACITY-AWARE LAYER-4 LOAD BALANCER

CLAIM OF BENEFIT TO PRIOR APPLICATIONS

This application is a continuation application of U.S. patent application Ser. No. 17/746,830, filed May 17, 2022. U.S. patent application Ser. No. 17/746,830 is hereby incorporated by reference.

BACKGROUND

Today, the Layer-4 (L4) load-balancer is one of the foundational blocks of web services. These load balancers assume that the capacity of the backend instances is uniform and/or fixed. However, at best, such an assumption is restrictive, and at worst, it breaks down (e.g., especially in virtualized clusters). Existing load balancers do not load balance in accordance with the capacities of these backend instances, causing the latencies for requests going to the over-utilized instances to increase to 2 times as high.

BRIEF SUMMARY

Some embodiments of the invention provide a method of efficiently load balancing across a set of data compute nodes (DCNs) by reducing latency for the set of DCNs. The method of some embodiments is performed by components of a load balancer (e.g., the layer-4 (L4) AVI Load Balancer from VMware, Inc.) for the set of DCNs, and the DCNs can include virtual machines (VMs), a container, and physical computers (e.g., servers) with identical hardware and software, according to some embodiments. From the set of DCN, the method identifies a first subset of DCNs that includes DCNs that have a latency that is higher than an average latency computed for the set of DCNs and identifies a second subset of DCNs that includes DCNs that have a latency that is lower than the average latency computed for the set of DCNs. For each DCN in the first subset of DCNs, the method assigns to the DCN a weight value that corresponds to a target latency computed for the set of DCNs. Based on the assigned weight values for the first subset of DCNs, the method computes an excess weight value (i.e., the excess weight that remains after the weights have been reduced for the first subset of DCNs) and redistributes the excess weight value across the second subset of DCNs.

In some embodiments, each DCN in the set of DCNs has an assigned direct IP address (DIP), and rather than exposing these DIPs, the load balancer for the set of DCNs exposes at least one virtual IP address (VIP) for the entire set of DCNs. As the load balancer receives network traffic for the exposed VIP(s), it performs a load balancing operation (e.g., a round-robin operation) to load balance the received network traffic across the DIPs based on the weight values assigned to the set of DCNs. The weight value assigned to a DCN, in some embodiments, is indicative of the percentage of traffic that the load balancer is to direct toward that DCN relative to the total amount of traffic received for the exposed VIP(s). For instance, a DCN with an assigned weight value of 0.1 would be receiving 10% of the traffic directed toward the set of DCNs, according to some embodiments. In some embodiments, the assigned weight values further correspond to computing capacities of each DCN, such that DCNs having higher computing capacities are assigned higher weights (i.e., higher loads of traffic) and DCNs having lower computing capacities are assigned lower weights (i.e., lower loads of traffic). To start, in some embodiments, each DCN is assigned the same weight value, and the weight values are adjusted after latency measurements at the initial weight values are collected.

The average latency computed for the set of DCNs, in some embodiments, is computed by first determining, for each DCN in the set of DCNs, a rolling median latency for the DCN based on a set of ten most recent recorded latencies for the DCN at its current weight, and using the rolling median latencies for each DCN in the set of DCNs to compute an average latency for the set of DCNs. The target latency that is used to determine the reduced weights for the first subset of DCNs, in some embodiments, is equal to the average latency computed for the set of DCNs. In some embodiments, to assign the weight value that corresponds to the target latency, the components of the load balancer generate a map between weight values assigned to the DCN and latencies recorded at each of those weight values. The recorded latencies, in some embodiments, are representative of a rolling median calculated for the DCN at each weight value. In some embodiments, when an exact weight value for the target latency is not available in the map for a particular DCN, polynomial regression (i.e., a regression analysis modeling an independent variable and a dependent variable as an nth degree polynomial in the independent variable) is used to determine the weight value for the target latency.

In some embodiments, before identifying the first and second subsets of DCNs, each DCN in the set of DCNs has an assigned first weight value, and each assigned weight value that corresponds to the target latency is an assigned second weight value. The assigned first weight value, in some embodiments, is the same for each DCN in the set. The excess weight values for each DCN in the first subset are computed, in some embodiments, by subtracting the assigned second weight value from the assigned first weight value. For instance, a DCN having an assigned first weight value of 0.5 that is reduced to an assigned second weight value of 0.3 would result in an excess weight value of 0.2 to be redistributed across the second subset of DCNs.

To redistribute the computed excess weight value across the second subset of DCNs, in some embodiments, inverse differences must be computed for the second subset of DCNs. The inverse difference for each DCN corresponds to a percentage of the excess weight value that is to be redistributed to that DCN, according to some embodiments. The inverse difference for a DCN is calculated by first computing a difference between the average latency for the set of DCNs and a rolling median latency for the DCN at its current assigned weight (i.e., assigned first weight value), and dividing that difference by the sum of differences calculated for each DCN in the second subset. As a result, the excess weight is proportionally redistributed across the second subset of DCNs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 6 illustrates an algorithm used in some embodiments to perform the process in FIG. 2.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of efficiently load balancing across a set of data compute nodes (DCNs) by reducing latency for the set of DCNs. The method of some embodiments is performed by components of a load balancer (e.g., the layer-4 (L4) AVI Load Balancer from VMware, Inc.) for the set of DCNs, and the DCNs can include virtual machines (VMs), a container, and physical computers (e.g., servers) with identical hardware and software, according to some embodiments. From the set of DCN, the method identifies a first subset of DCNs that includes DCNs that have a latency that is higher than an average latency computed for the set of DCNs and identifies a second subset of DCNs that includes DCNs that have a latency that is lower than the average latency computed for the set of DCNs. For each DCN in the first subset of DCNs, the method assigns to the DCN a weight value that corresponds to a target latency computed for the set of DCNs. Based on the assigned weight values for the first subset of DCNs, the method computes an excess weight value (i.e., the excess weight that remains after the weights have been reduced for the first subset of DCNs) and redistributes the excess weight value across the second subset of DCNs.

Figure 1:
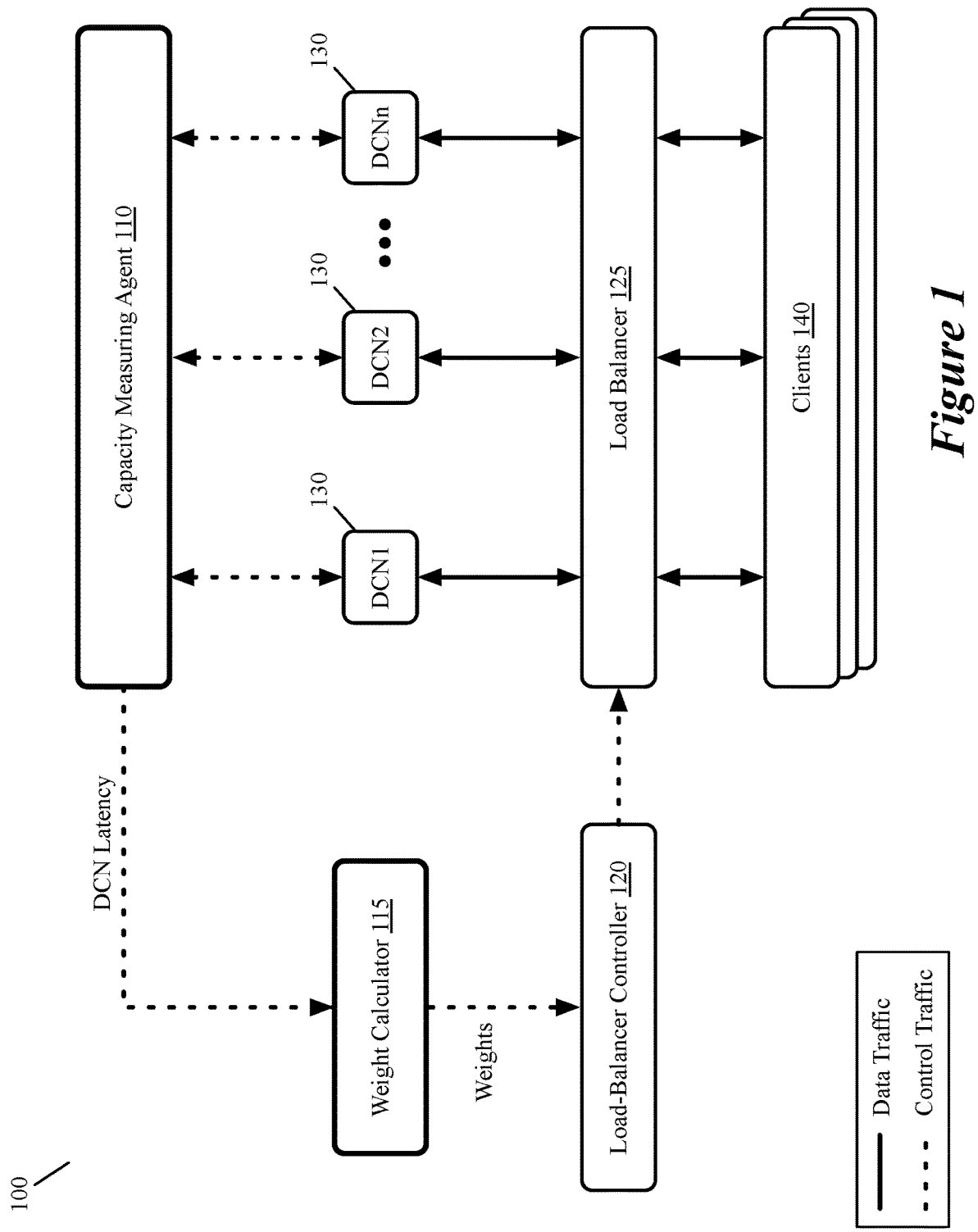
FIG. 1 conceptually illustrates an architectural diagram of some embodiments for a load balancer that implements capacity-aware load balancing.

FIG. 1 conceptually illustrates an architectural diagram 100 of some embodiments for a load balancer that implements capacity-aware load balancing. Rather than measuring latency on the front-end, the components illustrated in the diagram 100 measure latency between request and response for requests sent directly to the DCNs 130. Doing so, according to some embodiments, provides a better congestion signal as there are not any other infrastructure components that may provide a bottleneck and negatively affect performance of a service (e.g., web service) provided by the DCNs 130 (also referred to herein as server DCNs 130).

As shown, the architectural diagram 100 includes a load balancer 125 for load balancing requests between the clients 140 and the server DCNs 130, a load-balancer controller 120, and two loosely coupled components, weight calculator 115 and capacity measuring agent 110, for performing the measurements and calculations to assign weights to the DCNs 130. The architecture in the diagram 100 is configured to work with all load balancing designs, according to some embodiments, including load balancing designs that use software MUXes (e.g., Ananta, HAProxy, Avi, etc.) as well as hardware MUXes (e.g., Duet, SilkRoad, etc.). As such, the load balancer 125, in some embodiments, is multiple load balancers on multiple MUXes.

Additionally, the architecture does not run any agents on the MUXes (not shown), nor on any of the DCNs. As a result, DCNs and MUXes can be added or removed dynamically in some embodiments. In other words, the load balancing components in the diagram 100 run as standalone components (e.g., on VMs or containers), and use APIs to fetch metrics from relevant systems. The components of the diagram 100 perform all measurements online, and do not require any apriori information about the MUXes or DCNs (e.g., CPU count, latency, etc.) to process requests, in some embodiments, nor do they require any offline profiling of any such components.

In some embodiments, each of the DCNs 130 has an assigned DIP, and rather than exposing these DIPs, the load balancer 125 exposes at least one virtual IP address (VIP) for the entire set of DCNs. As the load balancer 125 receives network traffic from the clients 140 directed to the exposed VIP(s), it performs a load balancing operation (e.g., a round-robin operation) to load balance the received network traffic across the DIPs assigned to the DCNs 130 based on weight values assigned to the DCNs 130. In some embodiments, multiple DCNs may run on shared hardware.

The weight values assigned to the server DCNs 130 are calculated by the weight calculator 115 based on latency information provided by the capacity measuring agent 110. The capacity measuring agent 110 periodically measures the latency for requests from each DCN. It should be noted that the latency is not the TCP round-trip-time (RTT). Instead, the latency is measured for applications (i.e., applications running on the DCNs 130) based on the request provided by customers. In order to eliminate the interference of potential MUXes, the capacity measuring agent 110 sends requests directly to the DCNs 130 to measure latency (i.e., sends to the DIPs rather than the advertised VIP(s)). In some embodiments, separate DCNs (e.g., VMs) are instantiated in the same datacenter as the DIPs (i.e., DCNs) to measure the latency. Other embodiments of the invention may also instantiate measurement agents as part of the load balancer, on one or more client machines, and/or in the datapath between a client and a server DCN.

As mentioned above, the weight value assigned to a DCN, in some embodiments, is indicative of the percentage of traffic that the load balancer is to direct toward that DCN relative to the total amount of traffic received for the exposed VIP(s). For instance, a DCN with an assigned weight value of 0.1 would be receiving 10% of the traffic directed toward the set of DCNs, according to some embodiments. The assigned weight values further correspond to computing capacities of each DCN, in some embodiments, such that DCNs having higher computing capacities are assigned higher weights (i.e., higher loads of traffic) and DCNs having lower computing capacities are assigned lower weights (i.e., lower loads of traffic). In some embodiments, the initial weight values assigned to the DCNs are equal across all DCNs.

In some embodiments, minimum and maximum threshold values for tolerable latency may also be used for determining target latency. For instance, if a DCN has a maximum threshold for tolerable latency that is less than a calculated target latency for the set of DCNs, the DCN would not be assigned a weight value based solely on the target latency if that target latency is outside of the tolerance range for that DCN. In some embodiments, a DCN that is determined to be a non-candidate for latency reduction, for instance, may be restricted from receiving any of the excess weight to be redistributed following a reduction for another DCN. Instead, the excess weight would only be redistributed among DCNs for which the additional weight would not push the DCN outside of its tolerance range.

The weight calculator 115 calculates the weights based on the latency measurements from the capacity measuring agent 110. The core of the weight calculation algorithm utilized by the weight calculator is a map between weights and latency for each DIP. In order to achieve generality so that the embodiments described herein can be implemented across various load balancing designs, the capacity measuring agent 110 and weight calculator 115 do not assume that they have details on traffic, including existing traffic, to the individual DIPs, or details on total traffic. Instead, the components 110 and 115 use only the information on weight and latency. Because these components 110 and 115 are responsible for measuring the latency and setting the weights, they are always aware of the latencies and assigned weights across the DIPs 130.

The weight calculator 115 generates mappings between weights and latencies for each DCN 130, and uses the mappings to compute weight adjustments for the DCNs based on the capacities of the DCNs. After it has computed the weights for the DCNs 130, the weight calculator 115 sends the weights to the load balancer controller 120, which then load-balances the traffic according to the new weights, and the load balancer 125 runs a load balancing operation (e.g., a weighted round robin) using weights from the load balancer controller 120 to distribute traffic to the DCNs 130.

In some embodiments, the average latency computed for a set of DCNs is an average based on rolling median latencies for each DCN. The rolling median latency, in some embodiments, is based on the ten most recent recorded latencies for a DCN at its current weight. As a result, the weight-to-latency mappings for each DCN, in some embodiments, are dynamically updated as additional data (e.g., additional latency measurements at different weights) is collected. In some embodiments, the weight-to-latency mappings are stored in respective lookup tables for each DCN.

As mentioned above, the target latency that is used to determine the reduced weights for the first subset of DCNs is equal to the average latency computed for the set of DCNs, according to some embodiments. In some embodiments, when an exact weight value for the target latency is not available in the map for a particular DCN, the weight calculator 115 uses polynomial regression (i.e., a regression analysis modeling an independent variable and a dependent variable as an nth degree polynomial in the independent variable) to determine the weight value for the target latency for that DCN.

Primarily due to noise in various components (i.e., physical and virtual components) that the requests have to go through, latencies do not increase monotonically. To address this issue, polynomial regression and curve flattening are utilized, in some embodiments. In a first phase, polynomial regression is run on the latency measurements. Because polynomial regression does not guarantee monotonically increasing latency (i.e., with respect to load), curve flattening is then utilized to achieve monotonicity. In curve flattening, if the latency ($l\_i$) at any weight ($w\_i$) is lesser than the latency ($l\_s$) at smaller weight ($w\_s$), then we assign the $l\_i = l\_s$.

Figure 2:
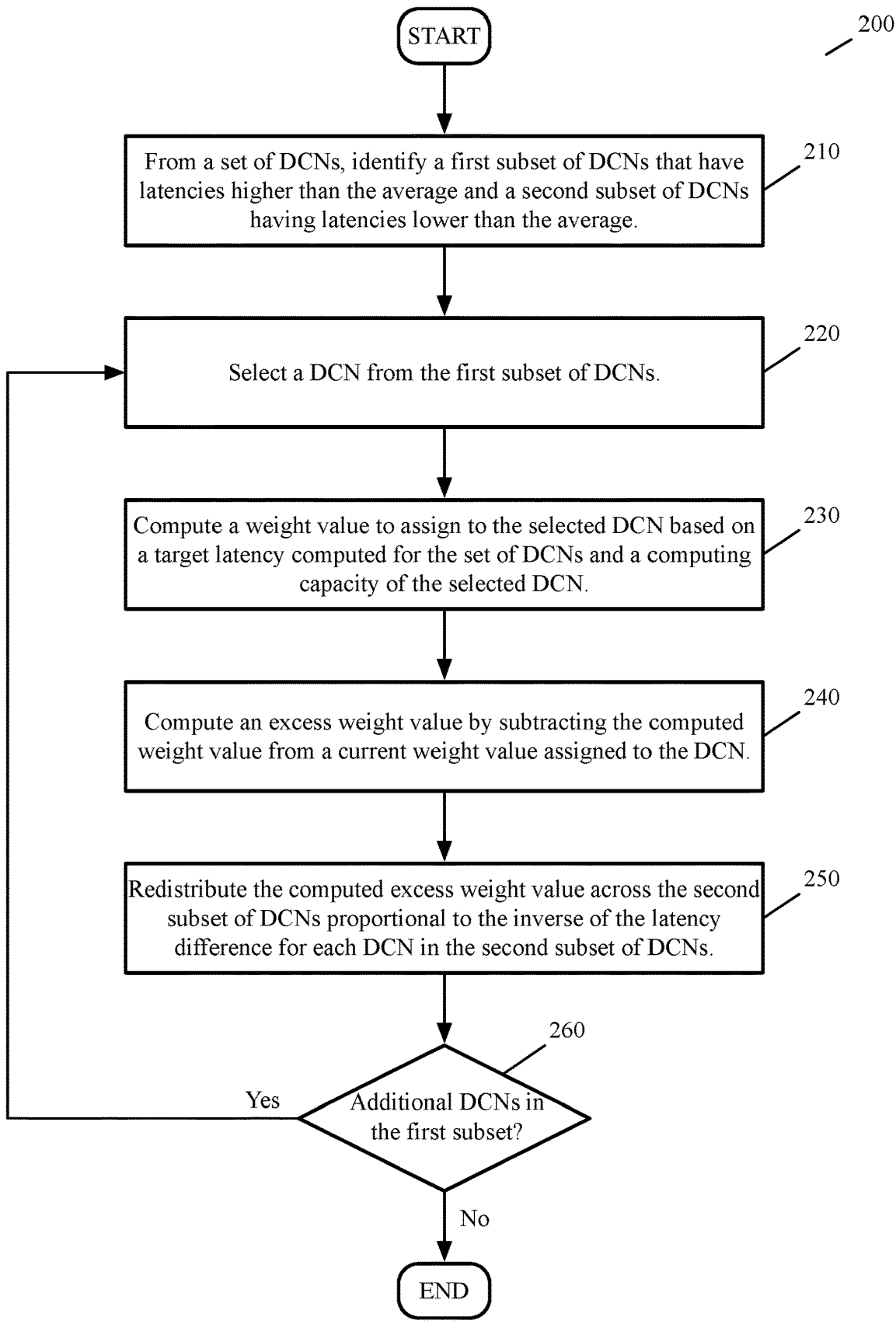
FIG. 2 conceptually illustrates a process of some embodiments for calculating and assigning weight values to DCNs.

FIG. 2 conceptually illustrates a process of some embodiments for calculating and assigning weight values to DCNs. The process 200 is performed, in some embodiments, by components of the architecture 100. The process 200 will be described below with reference to FIG. 3, which illustrates example latency mappings and calculations of some embodiments. The process 200 starts by identifying (at 210) a first subset of DCNs that have latencies that are higher than an average calculated for the DCN set as a whole, and a second subset of DCNs having latencies that are lower than the average. In some embodiments, this average latency is computed based on rolling average latencies for each DCN in the set at their current assigned weight values.

Figure 3:
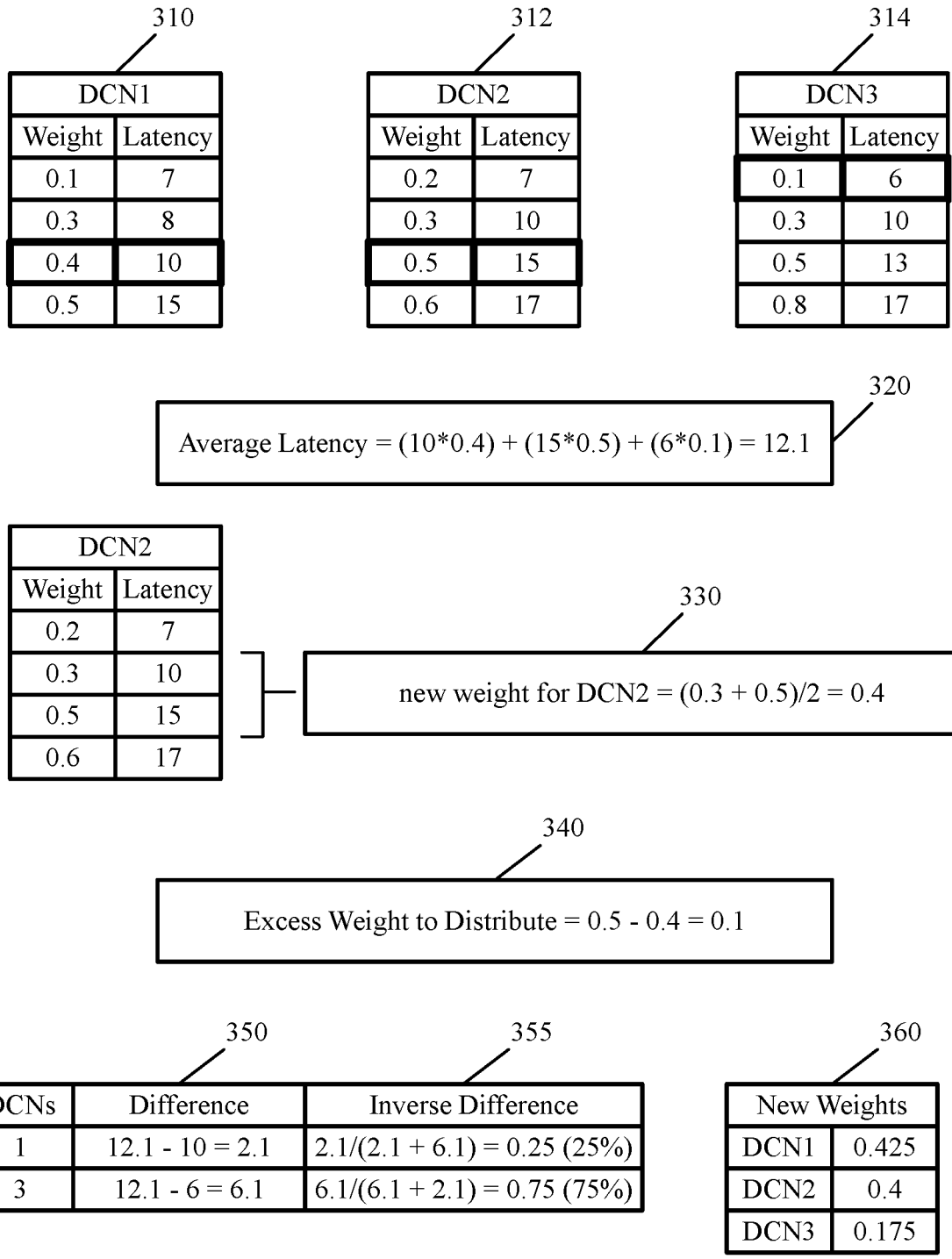
FIG. 3 illustrates example latency mappings and calculations of some embodiments.

For instance, in FIG. 3, a set of mappings 310, 312, and 314 are illustrated and correspond to measurements and calculations for three DCNs. The mappings 310-314, in some embodiments, are lookup tables that are dynamically updated for each DCN as additional data (e.g., latency measurements at various assigned weight values) is collected. In some embodiments, the latency values recorded in the mappings 310-314 are representative of the rolling median latencies at each weight indicated. As shown, the average latency 320 for these DCNs is calculated to be 12.1. Accordingly, DCN2 is identified as part of the first subset because its latency of 15 is above the average latency 12.1, whereas DCNs 1 and 3 are both below the average latency. The process selects (at 220) a DCN from the first subset of DCNs. In the example in FIG. 3, DCN 2 would be selected as it is the sole DCN in the first subset. While this example is limited for clarity, other embodiments can include more DCNs than those illustrated.

The process computes (at 230) a weight value to assign to the selected DCN based on a target latency computed for the set of DCNs and a computing capacity of the selected DCN. For instance, a new weight 330 is calculated for DCN 2. The new weight value is calculated by finding the median for DCN 2, as shown. As a result, a new weight of 0.4 is calculated to achieve the target latency for DCN 2.

Although latency shows correlation with the load, it does not say anything about the capacity of the DIPs (i.e., DCNs). For example, a latency of 10 ms does not say anything about whether the capacity is 200K packets per second or 400K packets per second. An increasing (or decreasing) latency only indicates that the load on that instance is increasing (or decreasing). To assign weights to DCNs to minimize the average latency across DCNs and to achieve uniform latency across DCNs, weights are moved from DCNs experiencing higher latency to DCNs experiencing lower latency.

Figure 4:
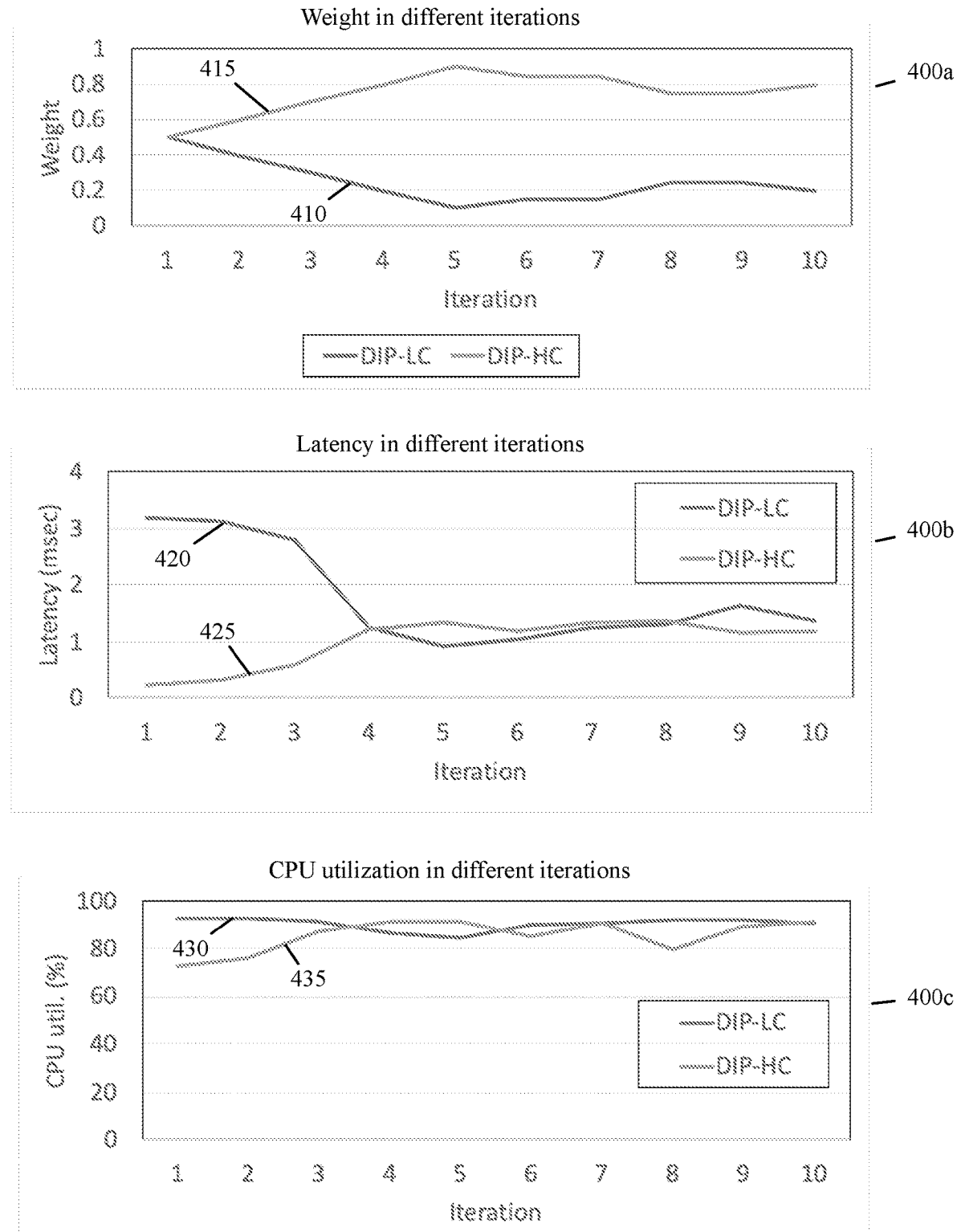
FIG. 4 illustrates a set of graphs showing changes to weight, latency, and CPU utilization in different iterations for two server DCNs, with one being a high capacity server DCN and the other being a low capacity server DCN.

Additionally, some embodiments use multiple iterations to achieve optimal weights. For example, FIG. 4 illustrates a set of graphs showing changes to weight, latency, and CPU utilization in different iterations for two server DCNs, with one being a high capacity server DCN and the other being a low capacity server DCN. Because the components of the load balancer do not use any apriori information, and rely solely on a map between weight and latency to decide the weight to be assigned, the weights are assigned as per the algorithm for each of the ten iterations, and the latencies are recorded. These values are used to populate the weight-to-latency map (e.g., maps 310-314), which is then used to calculate weight until optimal weights are reached.

As shown, the weights for the high and low capacity DCNs are equal in the first iteration in graph 400a, and the high capacity DCN is under-utilized (roughly 70% CPU utilization) while the low capacity DCN is over-utilized (roughly 95% CPU utilization). As a result, there is a large difference in latencies 420 and 425 on the two DCNs in graph 400b. As the load balancer observes the latencies, it assigns more weight to the high capacity DCN as indicated by the line 415 in graph 400a, which results in the CPU utilization 435 on the high capacity DCN in graph 400c to increase and the CPU utilization 430 on the low capacity DCN in graph 400c to decrease. Consequently, the latency 420 on the low capacity DCN in graph 400b also decreases. From iteration 4 onward, the CPU utilization in graph 400c and latencies in graph 400b are roughly the same on both the high and low capacity DCNs, as shown.

In some embodiments, because the process 200 does not use any offline measurements, there may be zero or only a few data points in the weight-to-latency map. In some such embodiments, the weight change is limited to 20% of the existing weight. For example, if the weight of a DCN having an existing weight of 0.1 is to be reduced, then the weight would be reduced to 0.08, and the latency would be recorded at that weight. As more data points are collected in the weight-to latency-map, the accuracy is improved for getting the weight for any target latency.

Figure 5:
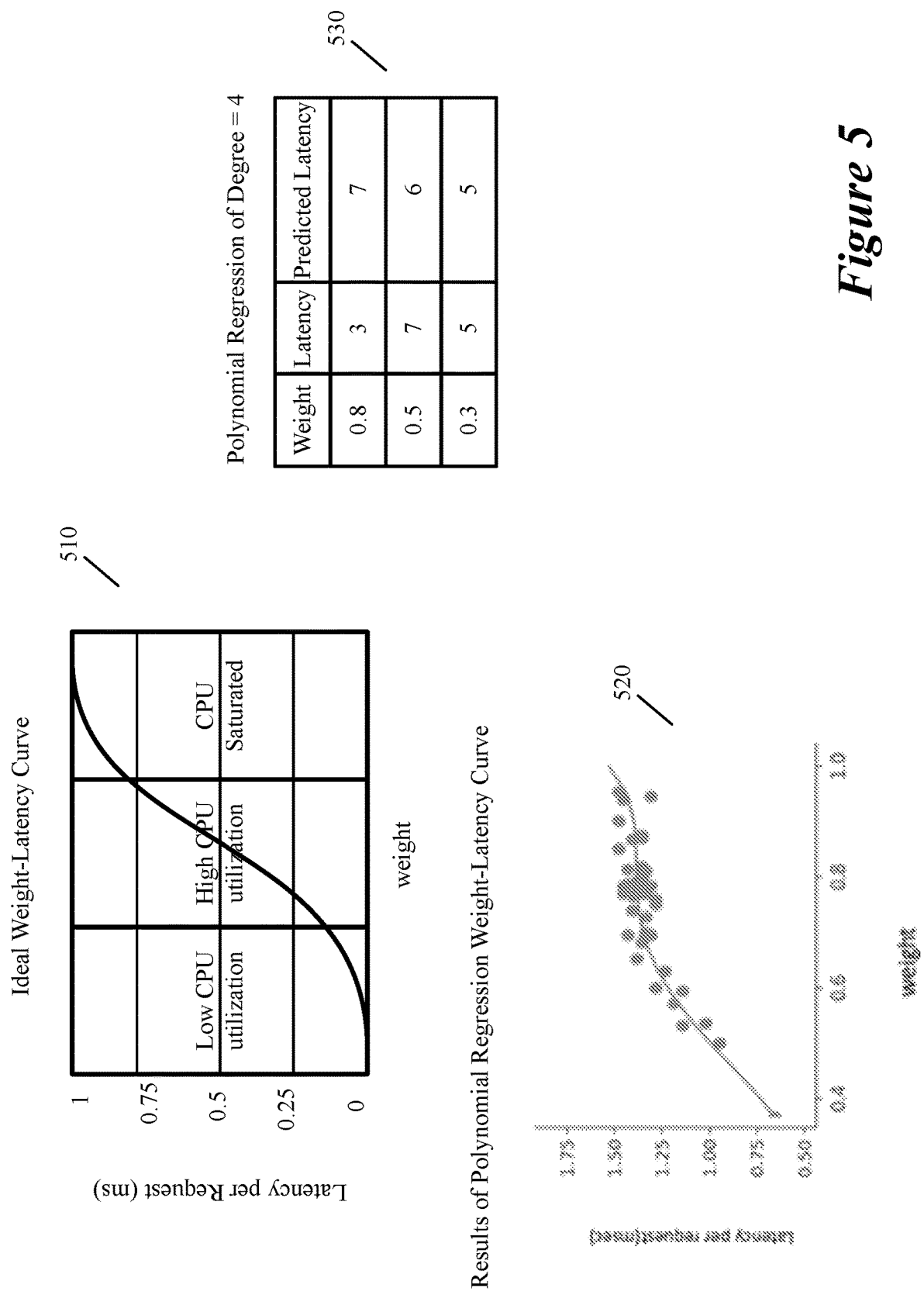
FIG. 5 illustrates an example of predictions and results when using polynomial regression in some embodiments.

As mentioned above, polynomial regression is utilized in some embodiments to determine a weight value for a target latency when no such weight value is available in the mapping for a DCN. FIG. 5 illustrates an example of predictions and results when using polynomial regression in some embodiments. The ideal weight-latency curve 510 illustrates the ideal curve representing latency increase as weight increases, and the resulting changes in CPU utilization. As shown, increase in latency should follow increase in weight. A graph 520 showing the results of a polynomial regression weight-latency curve is also provided. Similar to the curve 510, the curve 520 represents an increase in latency as weight increases. While not every data point is exactly on the curve, outliers are easier to spot and remove, which is further illustrated by the predicted latency chart 530.

Returning to the process 200, the process computes (at 240) an excess weight value by subtracting the computed weight value from a current weight value assigned to the DCN. As described above, the assigned weights correspond to a percentage of traffic directed toward a DCN, in some embodiments. Accordingly, a reduction in the weight assigned to a DCN means there will be excess weight to be reassigned to other DCNs. For instance, an excess weight value 340 is computed based on the reduction of the weight value assigned to DCN 2. As illustrated, the excess weight to be redistributed is equal to 0.1 or 10% of the traffic.

The process redistributes (at 250) the computed excess weight value across the second subset of DCNs proportional to the inverse of the latency difference for each DCN in the second subset of DCNs. In other words, the excess weight is evenly distributed across DCNs that were not candidates for latency reduction. In the examples in FIG. 3, the difference and inverse difference calculations 350 and 355 indicate 25% of the excess weight will be redistributed to DCN 1 and 75% of the excess weight will be redistributed to DCN 3, resulting in the new weights 360 illustrated. The process for computing these values will be described further below.

The process determines (at 260) whether there are additional DCNs in the first subset. While FIG. 3 includes only one DCN in the first subset, other embodiments of the invention can include additional DCNs for which new weights must be assessed. When the process determines that there are additional DCNs in the first subset, the process returns to select a DCN at 220. Otherwise, when the process determines that there are no additional DCNs in the first subset, the process 200 ends.

FIG. 6 illustrates an algorithm used in some embodiments to perform the process 200. As illustrated, and based on the symbol descriptions 605, the algorithm 600 uses weight and latency as input. For each DCN (or DIP) that is a candidate for latency reduction, the algorithm 600 calculates a new weight using the target latency (i.e., average) for all DCNs in the set. The algorithm 600 then calculates the differences and inverse differences for each non-candidate DCN in order to redistribute the excess weights.

As mentioned above, to redistribute the computed excess weight value across the second subset of DCNs, in some embodiments, inverse differences must be computed for the second subset of DCNs. The inverse difference for each DCN corresponds to a percentage of the excess weight value that is to be redistributed to that DCN, according to some embodiments. The inverse difference for a DCN is calculated by first computing a difference between the average latency for the set of DCNs and a rolling median latency for the DCN at its current assigned weight (i.e., assigned first weight value), and dividing that difference by the sum of differences calculated for each DCN in the second subset. As a result, the excess weight is proportionally redistributed across the second subset of DCNs.

Figure 7:
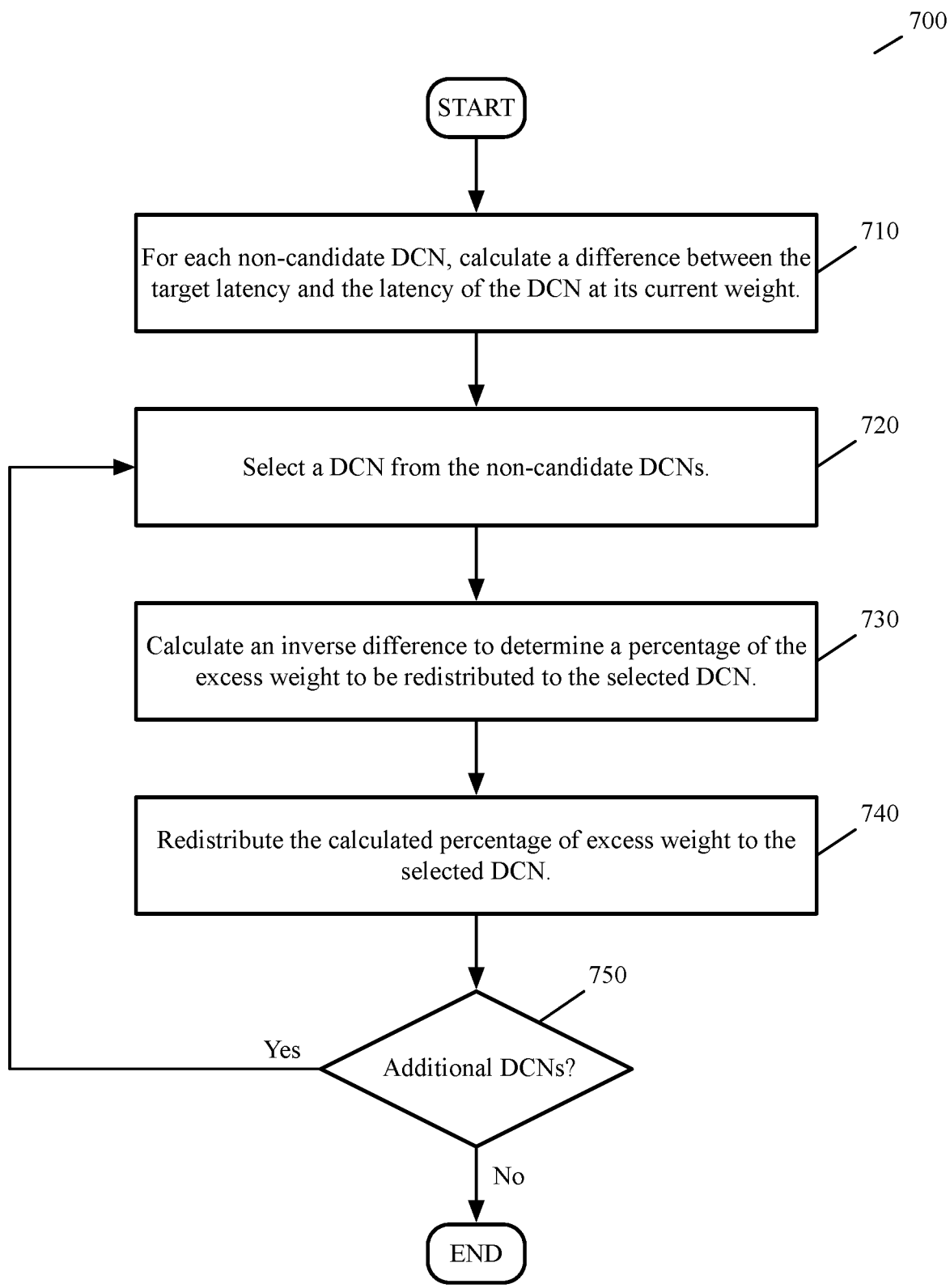
FIG. 7 illustrates a process of some embodiments for redistributing the excess weight that results from weight reductions for other DCNs.

FIG. 7 illustrates a process of some embodiments for redistributing the excess weight that results from weight reductions for other DCNs. Like the process 200, the process 700 is performed by components of the architecture diagram 100. The process 700 starts by calculating (at 710) a difference between the target latency and the latency of each DCN that was not selected for latency reduction (i.e., DCNs in the second subset of DCNs). In the example measurements and calculations illustrated by FIG. 3, these non-candidate DCNs would include DCNs 1 and 3. The difference calculated for DCN 1 is 2.1, and the difference calculated for DCN 3 is 6.1, as shown.

The process selects (at 720) a DCN from the non-candidate DCNs and calculates (at 730) an inverse difference to determine a percentage of the excess weight to be redistributed to the selected DCN. The inverse difference is calculated by diving the difference by the sum of differences for each non-candidate DCN. For instance, the inverse difference for DCN 1 is calculated by diving 2.1 by 8.2, which is the sum of the differences for both DCNs 1 and 3. The resulting number correlates to the percentage of excess weight to be redistributed to DCN 1.

The process redistributes (at 740) the calculated percentage of excess weight to the selected DCN. As illustrated by the new weights 360, DCN 1 has a weight increase from 0.4 to 0.425, and DCN 3 has a weight increase from 0.1 to 0.175. The process determines (at 750) whether there are additional DCNs for which excess weight is to be redistributed. In some embodiments, only one non-candidate DCN may be present, and all of the excess weight would be automatically redistributed to this single non-candidate DCNs. When the process determines that there are additional DCNs, the process returns to select (at 720) a DCN. Otherwise, when the process determines that there are no additional DCNs, the process ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
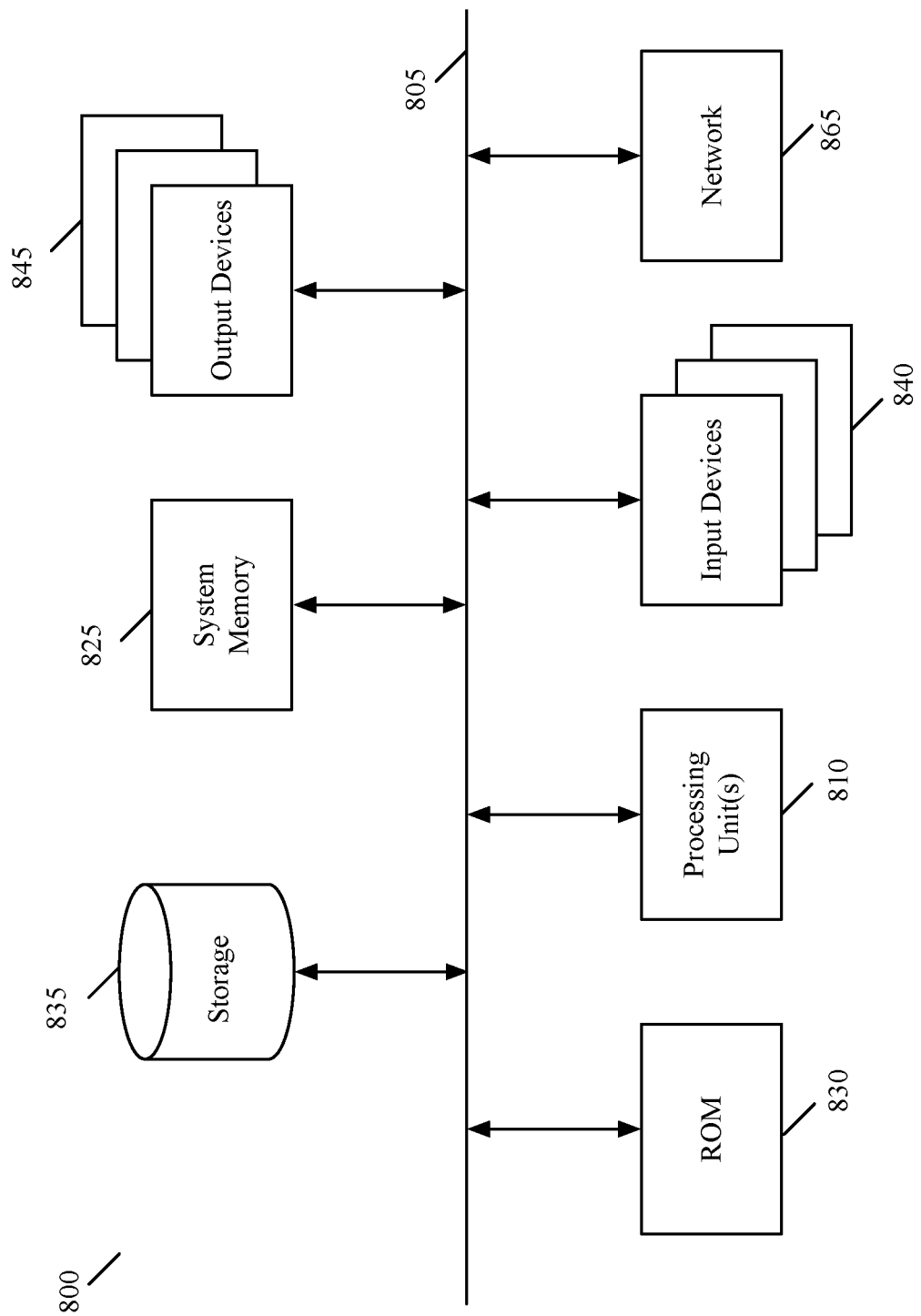
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described hosts, controllers, gateway, and edge forwarding elements. As such, it can be used to execute any of the above described processes. This computer system 800 includes various types of non-transitory machine-readable media and interfaces for various other types of machine-readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) 810 may be a single processor or a multi-core processor in different embodiments. The read-only-memory (ROM) 830 stores static data and instructions that are needed by the processing unit(s) 810 and other modules of the computer system 800. The permanent storage device 835, on the other hand, is a read-and-write memory device. This device 835 is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory 825 is a volatile read-and-write memory, such as random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices 840 enable the user to communicate information and select commands to the computer system 800. The input devices 840 include alphanumeric keyboards and pointing devices (also called "cursor control devices"). The output devices 845 display images generated by the computer system 800. The output devices 845 include printers and display devices, such as cathode ray tubes (CRT) or liquid crystal displays (LCD). Some embodiments include devices such as touchscreens that function as both input and output devices 840 and 845.

Finally, as shown in FIG. 8, bus 805 also couples computer system 800 to a network 865 through a network adapter (not shown). In this manner, the computer 800 can be a part of a network of computers (such as a local area network ("LAN"), a wide area network ("WAN"), or an Intranet), or a network of networks (such as the Internet). Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing capacity-aware load balancing across a set of compute nodes, the method comprising:
from the set of compute nodes, identifying (i) a first subset of compute nodes comprising compute nodes that have a latency that is higher than an average latency computed for the set of compute nodes and (ii) a second subset of compute nodes comprising compute nodes that have a latency that is lower than the average latency computed for the set of compute nodes;
for each particular compute node in the first subset of compute nodes, assigning, to the particular compute node, a reduced weight value based on a target latency computed for the set of compute nodes, and reducing data traffic forwarded by a set of load balancers to the first subset of compute nodes;
increasing one or more weight values assigned to one or more of the compute nodes in the second subset of compute nodes and increasing data traffic forwarded by the set of load balancers to the second subset of compute nodes;
computing, based on the reduced weight values assigned to the compute nodes in the first subset of compute nodes, an excess weight value to be redistributed across the second subset of compute nodes, wherein said increasing comprises redistributing the computed excess weight value across the second subset of compute nodes; and
distributing the reduced and increased weight values to the set of load balancers.

2. The method of claim 1, wherein the average latency computed for the set of compute nodes is computed by (i) computing, for each compute node in the set of compute nodes, a rolling average latency for the compute node based on a set of ten most recent recorded latencies for the compute node at a current weight value assigned to the compute node, and (ii) using the computed rolling average latencies for each compute node in the set of compute nodes to compute the average latency for the set of compute nodes.

3. The method of claim 1, wherein the target latency is equal to the average latency computed for the set of compute nodes.

4. The method of claim 1, wherein the excess weight value comprises a sum of excess weight values computed for each particular compute node in the first subset of compute nodes by subtracting the reduce weight value of the particular compute node from the weight value that was assigned to the particular compute node when the particular compute node had the latency higher than the average latency.

5. The method of claim 1, wherein the weight value assigned to each compute node in the set of compute nodes corresponds to a percentage of traffic that is directed toward the compute node.

6. The method of claim 5, wherein the weight value assigned to each compute node in the set of compute nodes further corresponds to a computing capacity of the compute node, wherein compute nodes having higher computing capacities are assigned higher weight values and compute nodes having lower computing capacities are assigned lower weight values.

7. The method of claim 1, wherein each compute node in the set of compute nodes comprises one of a virtual machine (VM), a container, and a physical computer.

8. The method of claim 1, wherein each compute node in the set of compute nodes is assigned a direct internet protocol (DIP) address, wherein the set of load balancers receives packets addressed to a virtual internet protocol (VIP) address associated with the set of compute nodes, and performs a load balancing operation to load balance [the] network traffic across the DIP addresses of the set of compute nodes based on the weight values assigned to the set of compute nodes.

9. The method of claim 8, wherein the load balancing operation is a weighted round-robin operation.

10. A non-transitory machine readable medium storing a program for execution by a set of processing units to perform capacity-aware load balancing across a set of compute nodes, the program comprising sets of instructions for:
from the set of compute nodes, identifying (i) a first subset of compute nodes comprising compute nodes that have a latency that is higher than an average latency computed for the set of compute nodes and (ii) a second subset of compute nodes comprising compute nodes that have a latency that is lower than the average latency computed for the set of compute nodes;
for each particular compute node in the first subset of compute nodes, assigning, to the particular compute node, a reduced weight value based on a target latency computed for the set of compute nodes, and reducing data traffic forwarded by a set of load balancers to the first subset of compute nodes;
increasing one or more weight values assigned to one or more of the compute nodes in the second subset of compute nodes and increasing data traffic forwarded by the set of load balancers to the second subset of compute nodes;
computing, based on the reduced weight values assigned to the compute nodes in the first subset of compute nodes, an excess weight value to be redistributed across the second subset of compute nodes, wherein said increasing comprises redistributing the computed excess weight value across the second subset of compute nodes; and
distributing the reduced and increased weight values to the set of load balancers.

11. The non-transitory machine readable medium of claim 10, wherein the average latency computed for the set of compute nodes is computed by (i) computing, for each compute node in the set of compute nodes, a rolling average latency for the compute node based on a set of ten most recent recorded latencies for the compute node at a current weight value assigned to the compute node, and (ii) using the computed rolling average latencies for each compute node in the set of compute nodes to compute the average latency for the set of compute nodes.

12. The non-transitory machine readable medium of claim 10, wherein the target latency is equal to the average latency computed for the set of compute nodes.

13. The non-transitory machine readable medium of claim 10, wherein the excess weight value comprises a sum of excess weight values computed for each particular compute node in the first subset of compute nodes by subtracting the reduce weight value of the particular compute node from the weight value that was assigned to the particular compute node when the particular compute node had the latency higher than the average latency.

14. The non-transitory machine readable medium of claim 10, wherein the weight value assigned to each compute node in the set of compute nodes corresponds to a percentage of traffic that is directed toward the compute node.

15. The non-transitory machine readable medium of claim 14, wherein the weight value assigned to each compute node in the set of compute nodes further corresponds to a computing capacity of the compute node, wherein compute nodes having higher computing capacities are assigned higher weight values and compute nodes having lower computing capacities are assigned lower weight values.

16. The non-transitory machine readable medium of claim 10, wherein each compute node in the set of compute nodes comprises one of a virtual machine (VM), a container, and a physical computer.

17. The non-transitory machine readable medium of claim 10, wherein each compute node in the set of compute nodes is assigned a direct internet protocol (DIP) address, wherein the set of load balancers receives packets addressed to a virtual internet protocol (VIP) address associated with the set of compute nodes, and performs a load balancing operation to load balance network traffic across the DIP addresses of the set of compute nodes based on the weight values assigned to the set of compute nodes.

18. The non-transitory machine readable medium of claim 17, wherein the load balancing operation is a weighted round-robin operation.

* * * * *